United States Patent
Shotey et al.

(10) Patent No.: US 7,683,257 B1
(45) Date of Patent: Mar. 23, 2010

(54) ELECTRICAL COVER PLATE

(75) Inventors: Marcus J. Shotey, Scottsdale, AZ (US);
Richard Cleghorn, Tempe, AZ (US);
Jeffrey P. Baldwin, Phoenix, AZ (US);
Edgar W. Maltby, Mesa, AZ (US);
Lincoln Jolley, West Jordan, UT (US)

(73) Assignee: TayMac Corporation, Gilbert, AZ (US)

( * ) Notice: Subject to any disclaimer, the term of this patent is extended or adjusted under 35 U.S.C. 154(b) by 406 days.

(21) Appl. No.: 11/466,756

(22) Filed: Aug. 23, 2006

Related U.S. Application Data

(60) Provisional application No. 60/710,979, filed on Aug. 23, 2005, provisional application No. 60/803,973, filed on Jun. 5, 2006.

(51) Int. Cl.
*H02G 3/04* (2006.01)

(52) U.S. Cl. ............................. 174/66; 174/67; 174/53; 174/57; 220/3.2; 220/3.3; 220/241; 220/242

(58) Field of Classification Search ................. 174/480, 174/481, 50, 53, 57, 58, 66, 67; 220/3.2–3.8, 220/241, 242; 439/535, 536, 537; D8/353; D13/177
See application file for complete search history.

(56) References Cited

U.S. PATENT DOCUMENTS

| | | | | |
|---|---|---|---|---|
| 1,952,719 A | * | 3/1934 | Lewin | 220/241 |
| 3,437,737 A | * | 4/1969 | Wagner | 174/66 |
| 3,437,738 A | * | 4/1969 | Wagner | 174/66 |
| 3,571,548 A | | 3/1971 | Osika | |
| 3,953,933 A | * | 5/1976 | Goldstein | 174/66 |
| 4,017,137 A | | 4/1977 | Parks | |
| 4,228,317 A | * | 10/1980 | Cziment | 174/67 |
| 4,998,635 A | * | 3/1991 | Vink et al. | 220/3.5 |
| 5,178,350 A | * | 1/1993 | Vink et al. | 220/3.5 |
| 5,180,886 A | | 1/1993 | Dierenbach et al. | |
| 5,744,750 A | | 4/1998 | Almond | |
| 5,898,130 A | * | 4/1999 | Tansi et al. | 174/66 |
| 5,961,345 A | * | 10/1999 | Finn et al. | 439/536 |
| 5,965,846 A | | 10/1999 | Shotey et al. | |
| 6,281,438 B1 | * | 8/2001 | Desilets et al. | 174/53 |
| 6,384,354 B1 | | 5/2002 | Shotey et al. | |
| 6,441,304 B1 | * | 8/2002 | Currier et al. | 174/53 |
| 6,570,091 B1 | | 5/2003 | Kesler et al. | |

(Continued)

FOREIGN PATENT DOCUMENTS

EP 0744805 B1 11/1996

OTHER PUBLICATIONS

Author: Cooper Wiring Devices; Title of Article: New G-Tool to Assure Alignment of Multi-Gang Installations; Title of the Item: press release from website; pp. 2, 2006.

(Continued)

*Primary Examiner*—Angel R Estrada
(74) *Attorney, Agent, or Firm*—Booth Udall, PLC

(57) ABSTRACT

Implementations of an electrical cover plate assemblies feature a frame with a finished surface and at least one adapter plate recess in the finished surface. The adapter plate recess includes an electrical device aperture. An adapter plate couples with the frame at the adapter plate recess and is sized to fill the adapter plate recess substantially from its extents at least approximately to an edge of the electrical device aperture.

22 Claims, 7 Drawing Sheets

U.S. PATENT DOCUMENTS

| | | | | |
|---|---|---|---|---|
| 6,616,005 B1 * | 9/2003 | Pereira et al. | ................ | 220/241 |
| 6,642,453 B2 | 11/2003 | Shotey et al. | | |
| 6,901,779 B2 * | 6/2005 | Magee et al. | ................. | 174/66 |
| 6,977,342 B1 | 12/2005 | Shotey et al. | | |
| 7,067,737 B2 * | 6/2006 | Mallen | ....................... | 174/66 |
| 7,122,740 B2 * | 10/2006 | Xu et al. | ....................... | 174/66 |

OTHER PUBLICATIONS

Author: NO MORE SCREWS.COM; Title of Article: Installing the Cheetah Speed System; Title of the Item: webpage; pp. 1, 2004.

* cited by examiner

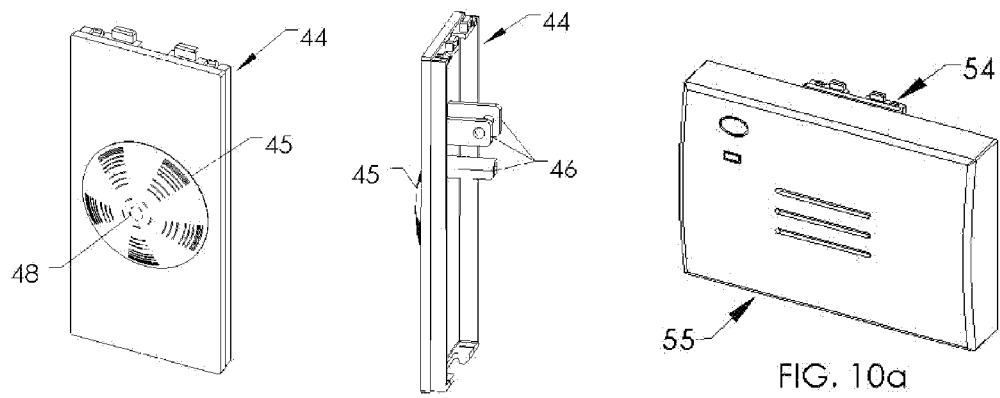
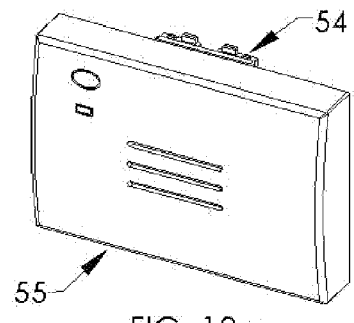
FIG. 8a  FIG. 8b  FIG. 10a
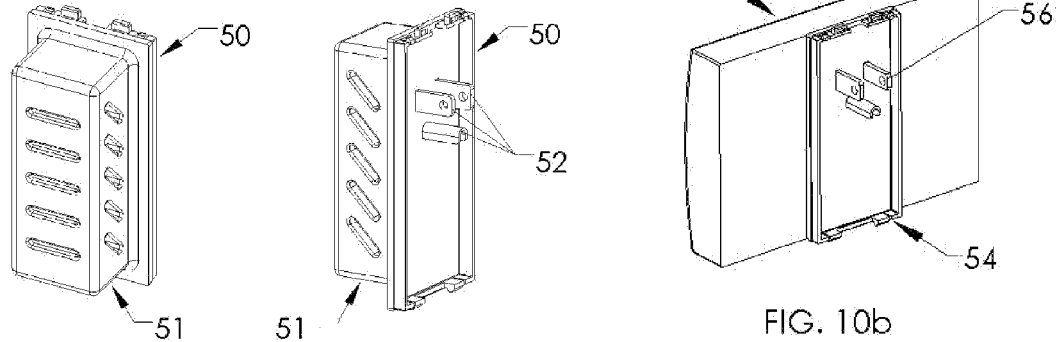
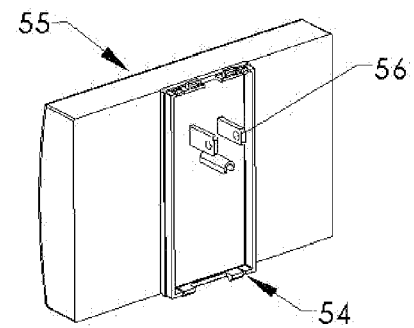
FIG. 9a  FIG. 9b  FIG. 10b
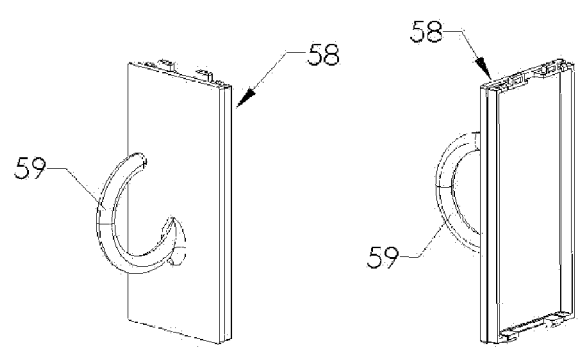
FIG. 11a  FIG. 11b

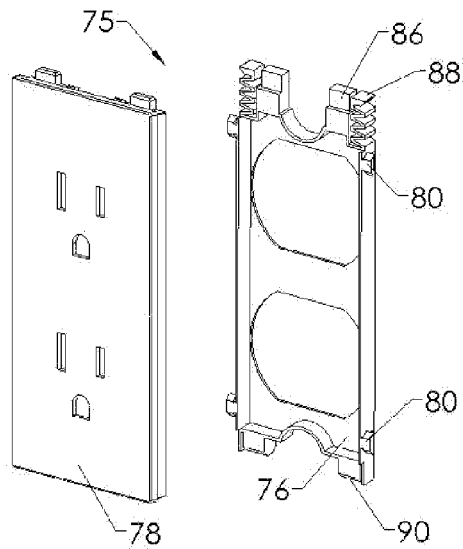 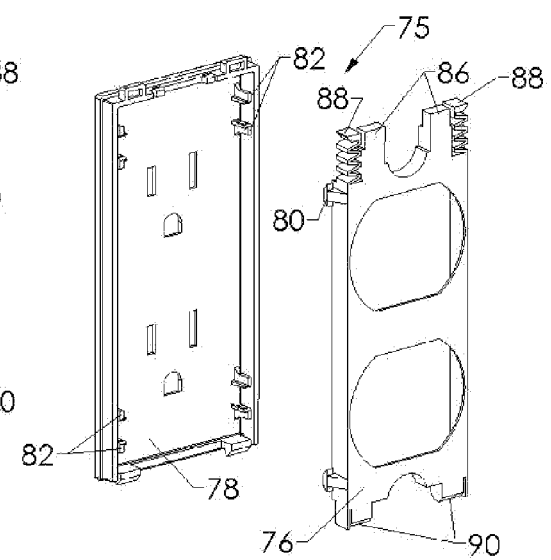
FIG. 16a
FIG. 16b
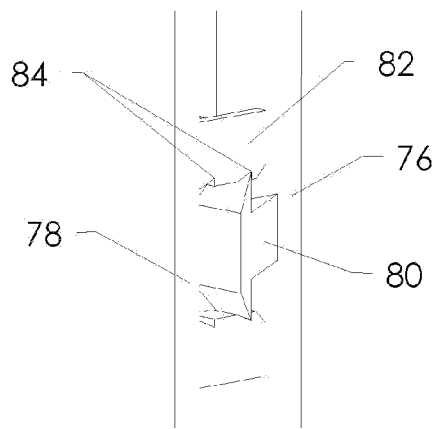 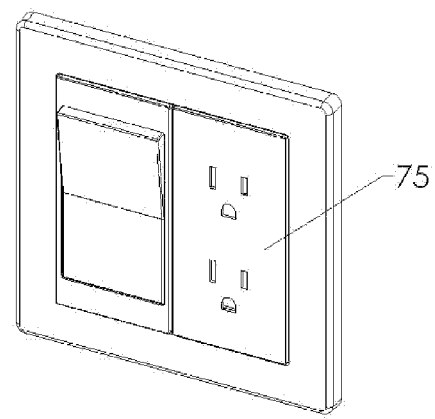
FIG. 17a
FIG. 17b

ELECTRICAL COVER PLATE

CROSS REFERENCE TO RELATED APPLICATIONS

The present application claims the benefit of the filing date of U.S. Provisional Patent Application 60/710,979, entitled "Snap-In Selectable Electrical Device Cover Plate System" to Shotey, et al. which was filed on Aug. 23, 2005, the disclosure of which is hereby incorporated herein by reference. The present application also claims the benefit of the filing date of U.S. Provisional Patent Application 60/803,973, entitled "Co-Planar Cover Plate System" to Shotey, et al. which was filed on Jun. 5, 2006, the disclosure of which is hereby incorporated herein by reference.

BACKGROUND

1. Technical Field

Aspects of this document relate generally to covers for electrical devices.

2. Background Art

Conventionally, to cover the exposed sides and wiring attached to electrical devices installed in electrical boxes, an electrical cover plate that includes openings that permit the exposed faces of the electrical devices is used. Removable tabs have been used to permit conversion of electrical device covers from one type to another, an example of which is shown and described in U.S. Pat. No. 6,642,453 to Shotey, et al. (issued Nov. 4, 2003) titled "Convertible electrical device cover and method for installing same," the disclosure of which is hereby incorporated herein by reference. Since changing of the colors of electrical devices once installed (particularly switches) generally requires removing and reinstalling new electrical devices of the desired color, methods for covering the exposed surfaces of installed electrical devices such as switches have been devised, examples of which are shown are described in U.S. Pat. No. 6,384,354 to Shotey, et al. (issued May 7, 2002) titled "Cover for electrical switch," the disclosure of which is hereby incorporated herein by reference. Also, various methods for quickly attaching an electrical device cover to an electrical device box have been sold by companies such as Lamson and Sessions, Inc. of Cleveland, Ohio under the Carlon brand and Cheetah USA Corp. of Salt Lake City, Utah.

SUMMARY

In one aspect, an implementation of an electrical cover plate assembly features a frame with a finished surface and at least one adapter plate recess in the finished surface. The adapter plate recess has an electrical device aperture which is also recessed with respect to the finished surface of the frame. An adapter plate is provided that couples with the frame at the adapter plate recess and is sized to fill the adapter plate recess substantially from its extents at least approximately to an edge of the electrical device aperture. The electrical cover plate assembly may be manufactured from plastic or other conventional material for electrical cover plates using conventional fabrication methods.

Specifically, a particular implementation of a frame features a mounting structure that couples the frame to at least one of the electrical box, an electrical device mounted within the electrical box, and a wall to which the electrical box is mounted. Particular implementations of a frame include adapter plate recesses where the mounting structure is a box mounting screw aperture positioned to receive a box mounting screw of an electrical device when the electrical cover plate is mounted on an electrical box. In these implementations, the box mounting screw aperture is recessed with respect to the finished surface of the frame and the at least one adapter plate conceals the box mounting screw aperture when coupled to the frame. In particular implementations, the box mounting screw aperture is a keyhole mounting screw aperture.

Particular implementations of an electrical cover plate assembly feature an adapter plate with a catch mechanism having a catch and a spring element on at least one side of the adapter plate, the adapter plate being coupled to the frame through the catch mechanism. Other particular implementations of an electrical cover plate assembly feature an adapter plate recess that contains apertures configured to align with the catch mechanism of the adapter plate.

In one aspect, an implementation of an electrical cover plate assembly features a frame with a finished surface and at least one adapter plate recess in the finished surface. The adapter plate recess has an adapter plate attachment aperture, a box mounting screw aperture, and an electrical device aperture. At least one adapter plate is configured to couple to the frame at the adapter plate recess through a catch mechanism. The catch mechanism has a catch and a spring element on a first side of the adapter plate. When coupled to the frame, the adapter plate conceals the box mounting screw aperture and fills the adapter plate recess substantially from its extents at least approximately to an edge of the electrical device aperture. The electrical cover plate assembly may be manufactured from plastic or other conventional material for electrical cover plates using conventional fabrication methods. In particular implementations, the box mounting screw aperture is a keyhole mounting screw aperture.

Particular implementations of an electrical cover plate assembly include an adapter plate with a removable tab where removal of the removable tab converts the adapter plate to an adapter plate having an opening therethrough configured for an electrical device. Other particular implementations feature adapter plates configured for an electrical device such as a decora-style electrical device, a ground fault circuit interrupter outlet and a rocker switch. The adapter plate in particular implementations is configured to fill the adapter plate recess substantially from its extents approximately up to the edge of the electrical device face.

Other particular implementations of an electrical cover plate assembly feature an adapter plate configured for an electrical device such as a duplex outlet, a ground fault circuit interrupter, a toggle switch, a rocker switch, a rotary dimmer switch and a sliding dimmer switch. In these particular implementations too, the adapter plate is configured to fill the adapter plate recess substantially from its extents approximately up to the edge of the electrical device face.

Particular implementations of an electrical cover plate assembly include an electrical device, such as a nightlight, an emergency light, a fan, an air freshener, a carbon monoxide sensor, a natural gas sensor, an electrical device charging cradle, a hair dryer charging cradle, a cable modem holder, a wireless router holder, a smoke detector, and a rechargeable battery charger, coupled to an adapter plate. Other implementations include battery powered electrical devices coupled to the adapter plate such as a smoke detector, a remote ceiling fan controller, a security sensor, an intercom, a fan, a nightlight, an emergency light and a light switch controller. Yet other particular implementations feature a non-electrically powered devices such as a keychain holding hook, a coat hanger, a key storage device, a paper towel holder, a mail holder, and a pet leash holder.

Particular implementations of an electrical cover plate assembly include those in which the finished surface has at least two similarly configured adapter plate recesses. The at least two adapter plate recesses may include an alignment separator between them. The alignment separator forms at least a portion of an edge of the electrical device aperture associated with each adapter plate recess. The electrical device aperture associated with each adapter plate recess is substantially parallel to the adapter plate recess adjacent to it and is sized to contact at least a portion of each electrical device to be mounted therein and automatically aligns the electrical devices with each other and the frame.

Other particular implementations of an electrical device cover plate assembly feature an adapter plate including a spacer plate coupled between an adapter shell and the frame.

In another aspect, a particular implementation features a method of installing an electrical cover plate assembly. The method includes providing an electrical box and at least one electrical device mounted to the electrical box with box mounting screws. A frame is coupled to the electrical box with the electrical box mounting screw. The frame has a finished surface and an adapter plate recess in the finished surface. The adapter plate recess includes at least one box mounting screw aperture and an electrical device aperture each recessed with respect to the finished surface. The box mounting screw aperture is concealed by coupling an adapter plate to the frame at the adapter plate recess and the adapter plate is sized and shaped to fill the adapter plate recess substantially from its extents at least approximately to an edge of the electrical device.

Another particular implementation includes at least two electrical devices and a frame that includes at least two electrical device apertures. The electrical devices are automatically aligned when the frame is mounted to the electrical box with the mounting screws by contacting at least one edge of each of the electrical devices with an edge of a corresponding electrical device aperture.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and:

FIG. 8a is a front perspective view of a nightlight adapter plate;

FIG. 8b is a rear perspective view of a nightlight adapter plate;

FIG. 9a is a front perspective view of an air freshener adapter plate;

FIG. 9b is a rear perspective view of an air freshener adapter plate;

FIG. 10a is a front perspective view of an adapter plate carbon monoxide sensor;

FIG. 10b is rear perspective view of an adapter plate carbon monoxide sensor;

FIG. 11a is a front perspective view of an adapter plate keychain hook;

FIG. 11b is a rear perspective view of an adapter plate keychain hook;

FIG. 16a is a front exploded perspective view of a shell and spacer plate;

FIG. 16b is a rear exploded perspective view of a shell and spacer plate;

FIG. 17a is a front detail perspective view of a set of projections and slots on a shell coupled with a tab on a spacer plate;

FIG. 17b is a front perspective view of a frame with an installed shell and spacer plate for a duplex receptacle which shows the co-planar exposed faces of a rocker switch and duplex receptacle;

DESCRIPTION

This disclosure, its aspects and implementations, are not limited to the specific components or assembly procedures disclosed herein. Many additional components and assembly procedures known in the art consistent with the intended electrical cover plate and/or assembly procedures for an electrical cover plate will become apparent for use with implementations of an electrical cover plate from this disclosure. Accordingly, for example, although particular frames, adapter plates, electrical devices, and non-electrically powered structures are disclosed, such devices and structures and their implementing components may comprise any shape, size, style, type, model, version, measurement, concentration, material, quantity, and/or the like as is known in the art for such devices and structures and their implementing components, consistent with the intended operation of an electrical cover plate.

Structure

Figures 1A, 1B:
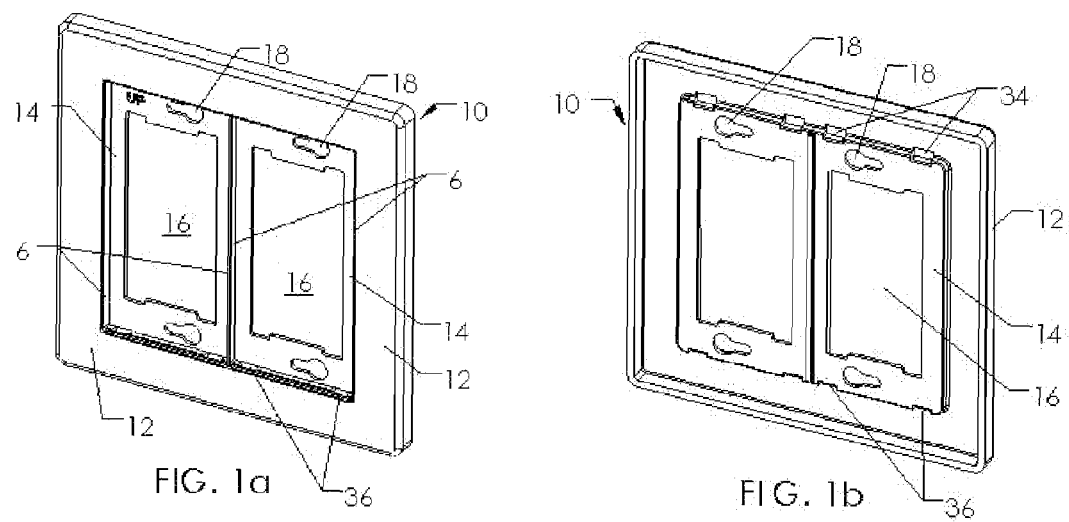
FIG. 1a is a front perspective view of a frame.
FIG. 1b is a rear perspective view of a frame.

Referring to FIGS. 1a and 1b, a frame 10 for an electrical cover plate is illustrated. The frame 10 includes a "finished surface" 12 that is the surface visible when the frame 10 is installed on an electrical device. As used herein, "finished" is intended to mean and include the final part that is visible when the assembly is completed. Nothing else is needed over the finished surface of the frame in FIG. 1a; it is complete and intended to be used and displayed without any other covering over that portion. The frame 10 also includes an adapter recess 14 which includes an electrical device aperture 16 and at least one box mounting screw aperture 18. The extents 6 of the adapter recess 14 are the side walls surrounding it and forming the recess. The frame 10 shown in FIGS. 1a and 1b shows that the box mounting screw apertures 18 may be keyhole slot apertures. Although other box mounting screw apertures may be used, keyhole slot apertures make installation of the frame 10 faster and easier than fully removing the box mounting screws from the electrical box prior to installation.

Figure 2:
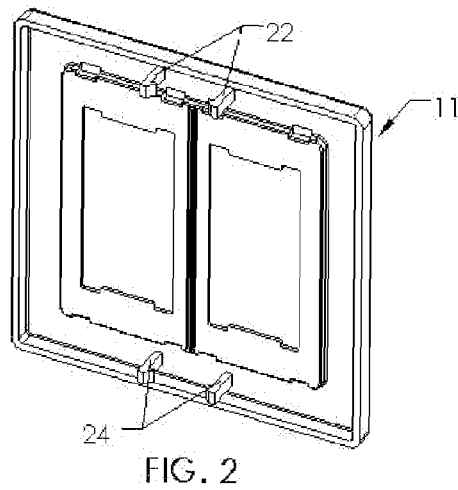
FIG. 2 is a perspective view of a frame with mounting prongs.

Although it is considered that in most cases a conventional electrical box, such as a conventional "blue box" manufactured by Lamson and Sessions, Inc. of Cleveland, Ohio under the Carlon brand, the frame may be adapted to couple with other custom electrical boxes. The electrical boxes manufactured by Cheetah USA Corp. of Salt Lake City, Utah is one example of an alternative box design to which the various frame implementations shown and described in this disclosure may be adapted. Referring to FIG. 2, a frame 11 is shown with mounting prongs 22, 24 configured to couple with correspondingly adapted or formed apertures in the electrical box. The use of mounting prongs 22, 24 coupled with apertures in an electrical box removes the need to use conventional box mounting screws used for installing electrical devices into the box to fasten the frame 11 to the box. Other quick-connect box designs are also on the market that allow a cover to be quickly installed onto an electrical box. Those of ordinary skill in the art will readily understand how to adapt the disclosed frame implementations to differing electrical box connections without undue experimentation.

Figures 3A, 3B:
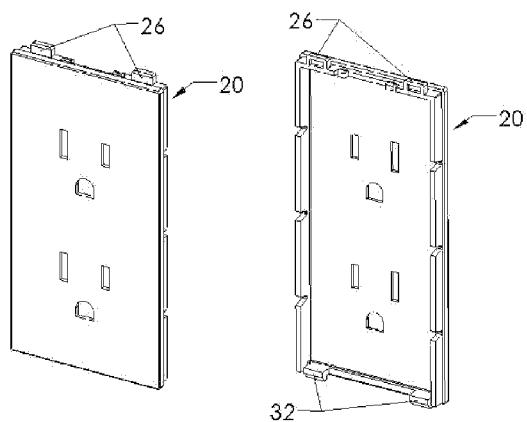
FIG. 3a is a front perspective view of an adapter plate.
FIG. 3b is a rear perspective view of an adapter plate.
Figure 4A:
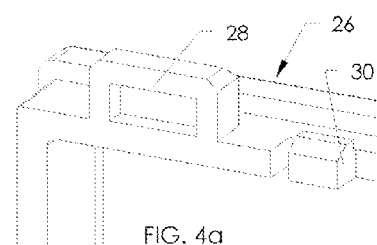
FIG. 4a is a detail view of an adapter plate catch mechanism.
Figure 4B:
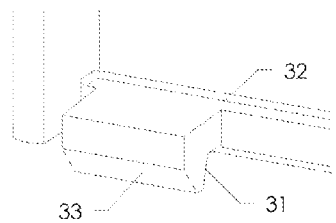
FIG. 4b is a detail view of an adapter plate pawl.
Figure 5A:
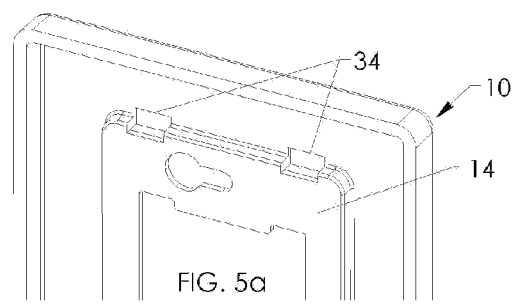
FIG. 5a is a detail view of the adapter plate catch mechanism when the adapter plate is coupled with the frame.
Figure 5B:
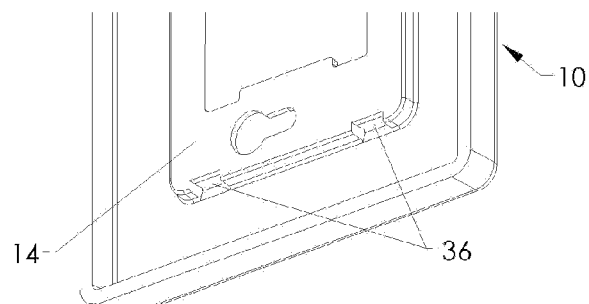
FIG. 5b is a detail view of the adapter plate pawl when the adapter plate is coupled with the frame.

FIGS. 3a and 3b illustrate front and rear views of an implementation of an adapter plate 20 sized and shaped to fit at least partially into the adapter plate recess 16 of the frame 10 is illustrated. The adapter plate 20 of this particular implementation includes two catch mechanisms 26 on an upper edge and two pawls 32 on a lower, opposing edge. As illustrated more closely in the close-up view of FIG. 4a, the catch mechanism 26 of this implementation includes a catch 28 and a spring element 30. The spring element 30 is configured to maintain a bias against the frame 10 when the adapter plate 20 is coupled to the frame 10. Referring to FIG. 4b, a pawl 32 is illustrated for this implementation. The pawl 32 includes angled surfaces on two of its faces 31 and 33. The angled faces 31 and 33 assist in respectively removing and inserting the adapter plate 20. The pawls 32 and catch mechanisms 26 may couple to the frame 10 at an adapter plate recess 14 through coupling apertures 34 and 36 (see FIGS. 1b, 5a, and 5b). FIGS. 5a and 5b illustrate close-up views of the relationship between an implementation of the adapter plate recess 14, the coupling apertures 34 and 36, and the respective catch mechanism 26 and pawl 32.

Figures 6A, 6B:
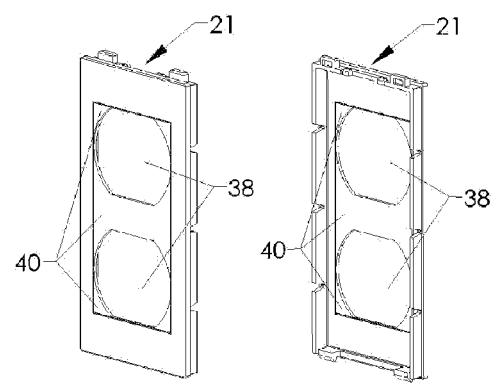
FIG. 6a is a front perspective view of a blank adapter plate with removable tabs for duplex and ground fault circuit interrupter receptacles.
FIG. 6b is a rear perspective view of a blank adapter plate with removable tabs for duplex and ground fault circuit interrupter receptacles.

FIGS. 6a and 6b illustrate a front and rear view of an implementation of an adapter plate 21 with removable tab sets 38, 40. The adapter plate 21 of this implementation is initially configured as a "blank" having no openings configured to accommodate an electrical device face. Among other uses, blank adapter plates may be useful for childproofing electrical devices. Blank adapter plates adapted for childproofing applications may also include plug blade apertures that are initially closed with a layer of stationary or moveable plastic, but can be made open such as through mechanical movement known in childproofing cover art or being penetrated through insertion of plug blades through a thin film of plastic over each of the plug blade apertures of the adapter plate.

Depending on whether the electrical device to be accommodated is a duplex or ground fault current interrupter (GFCI) receptacle for this implementation, either of the removable tab sets 38, 40 may be removed to allow access to the face of the receptacle. The particular implementation illustrated in FIGS. 6a and 6b also shows that the adapter plate 21 is designed to expose the face of the receptacle, while the particular implementation illustrated in FIGS. 3a and 3b is designed to conceal the face of the receptacle while providing access through plug blade apertures to corresponding plug blade apertures in an electrical device behind the adapter plate 20. Particular implementations may also include adapter plates designed to conceal part of an electrical device while providing removable tabs for exposing another part of the device (such as a reset button on a ground fault circuit interrupter (GFCI) device) if so desired.

Figure 7:
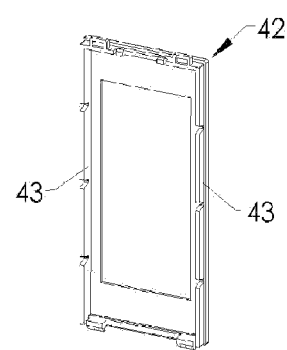
FIG. 7 is a front perspective view of an adapter plate for a decora style receptacle.

Another particular implementation of an adapter plate 42 is illustrated in FIG. 7. For certain types of electrical devices, known as "decorator-style" or "decora-style" devices, the device face is a large rectangle. In combination with the frame 10 implementation of FIGS. 1a and 1b, the device face of a decora-style device will fill much of the electrical device aperture 16 in the frame 10 leaving only a small space in the adapter plate recess 14 along two of its edges. This is illustrated best in the implementations shown in FIGS. 14b, 15, 18 and 20. To permit the adapter plate 42 to fit over a decora-style receptacle, two thin sides 43 are used to connect the top part of the adapter plate 42 to its lower portion. These thin sides 43 fill the remaining space in the adapter plate recess 14 at least up to an edge of the electrical device aperture 16 within the limits of any space required to ensure the receptacle and the adapter plate 42 will be able to be inserted and removed.

FIGS. 8a through 10b illustrate various examples of electrical devices coupled to adapter plates for mounting in an implementation of a disclosed frame. For some of these examples, the electrical devices are coupled permanently to the adapter plate (in some cases even coupled by forming integrally with the adapter plate). FIGS. 8a and 8b illustrate front and rear views of a night light 45 or emergency light 45 implementation coupled to an adapter plate 44. Although the implementation shown indicates that it may be plugged into a receptacle behind the adapter plate, by adapting the design to be battery powered, the light implementation may be used within a adapter plate recess regardless of whether there is a powered receptacle within the recess or not. FIG. 8a shows the front face of the adapter plate 44 which may be flat or nearly flat with a place for light from the nightlight 45 to escape. FIG. 8b illustrates the rear of the adapter plate 44 which includes prongs 46 that fit into an electrical receptacle covered by the adapter plate 44 and the light bulb 48 within the nightlight. As an alternative to a light bulb 48, other lighted films and electroluminescent materials may be used. These are common in the art of nightlights. One example is the Indiglo® material. The prongs 46 are inserted into the receptacle when the adapter plate 44 is inserted into the frame 10 thus powering the nightlight 45.

FIGS. 9*a* and 9*b* illustrate another particular implementation of an adapter plate 50 which includes an air freshener 51. The air freshener 51 is attached to the adapter plate 50 and a set of prongs 52 is attached to the rear of the adapter plate 50 illustrated in FIG. 10*b* to provide power to the air freshener. Like the nightlight 45, the air freshener may receive power from a receptacle when the adapter plate 50 is inserted into the frame 10, or may be adapted for battery or other power. Similarly, referring to FIGS. 10*a* and 10*b*, an adapter plate 54 implementation that includes a carbon monoxide sensor 55 is illustrated. The adapter plate 54 can best be seen in FIG. 11*b*, which also shows the prongs 56 that connect the carbon monoxide sensor 55 to power when the adapter plate 54 is inserted into a frame 10 over a receptacle.

The use of an adapter plate 44, 50, and 54 implementation like those shown in FIGS. 8*a* to 10*b* for electrically powered devices may help ensure these devices are not easily removable and may add to the convenience, improve the aesthetic appearance, and improve the safety performance of these devices while they are in use. While electrical devices that are connected directly to power through a receptacle have been illustrated in FIGS. 8*a*-10*b*, electrical devices that are powered by batteries and do not require a power connection may be included in particular implementations. Those of ordinary skill in the art will readily understand how to modify various electrical devices for use with an adapter plate to secure the device to the wall plate frame from the disclosure provided herein.

FIGS. 11*a* and 11*b* show a particular implementation of an adapter plate 58 that includes a non-electrically powered device. The particular device shown in FIGS. 11*a* and 11*b* is a hook 59 for a key chain or pet leash. Because the hook does not require electrical power, the adapter plate 58 can be installed in an adapter recess 14 in a frame 10 that does not have the electrical device aperture 16 filled by an installed electrical device. Alternatively, the adapter plate 58 can be installed over any electrical device that does not protrude above the finished surface 12 of the frame 10 (for example, a receptacle) if the adapter plate 58 is appropriately configured for the device behind it.

The principle of using an adapter plate that incorporates electrically or non-electrically powered devices can be extended to cover particular implementations of adapter plates intended to convert a universal electrical device that is configured to mount within a standard rocker switch or duplex outlet space in an electrical box from one device type to another. For example, an adapter plate configured with an interface that causes the universal electrical device to act as a toggle switch may initially be installed within the frame. If the user desires to remove the switch and replace it with a rocker switch interface, the toggle switch adapter plate can be removed and replaced with an adapter plate designed to convert the device to act as a rocker switch. Other implementations where the universal electrical device can be caused to operate as an electrical receptacle instead of a switch, for example, simply by exchanging appropriately configured adapter plates are contemplated.

Figure 12:
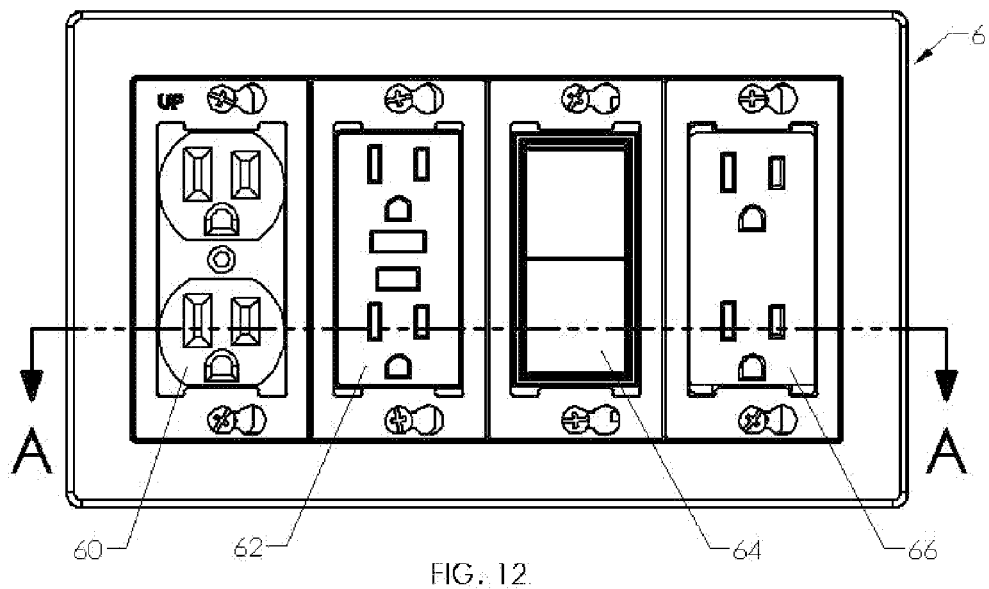
FIG. 12 is a front view of a four gang frame fastened to four electrical devices.
Figure 13:
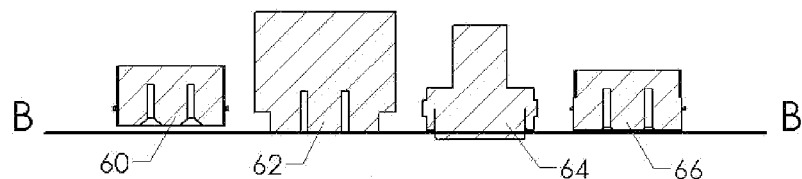
FIG. 13 is a cross section view taken along sectional line A in FIG. 12.

FIG. 12 illustrates a particular implementation of a four gang frame 6 that includes four different electrical devices, a duplex receptacle 60, a GFCI receptacle 62, a rocker switch 64, and a decora-style receptacle 66. Referring FIG. 13, a cross section view along the sectional line A of FIG. 12 is shown with the frame removed but a reference line B shown which indicates that the duplex receptacle 60 is recessed relative to a reference line B level with the face of the GFCI receptacle 62. The rocker switch 64 protrudes above the reference line 61 and the decora-style receptacle 66 is slightly recessed. Since the exposed faces of the electrical devices are not at the same level, their surfaces will not be co-planar if a conventional four gang electrical cover plate were installed.

Figure 14:
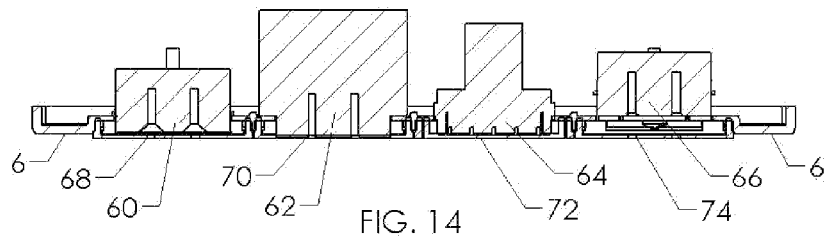
FIG. 14 is a cross section view taken along sectional line A in FIG. 12 when varying thickness adapter plates have been installed over the electrical devices of FIG. 12 showing the co-planar faces of the adapter plates.
Figure 15:
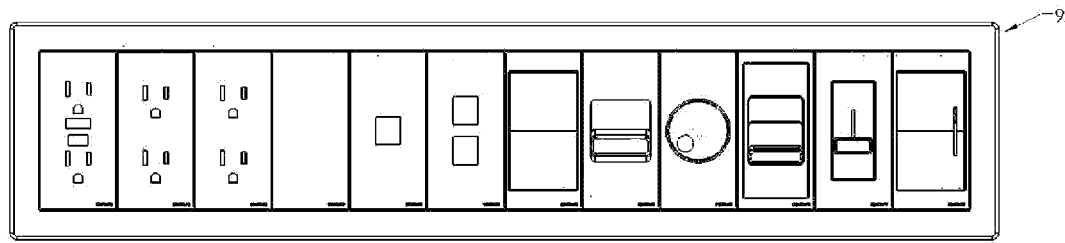
FIG. 15 is a front view of sixteen varying thickness adapter plates installed over different electrical devices defining a single co-planar surface.

Referring to FIG. 14, the viewable surface of the finished cover plate for the electrical devices can be rendered co-planar by the use of adapter plates 68, 70, 72, and 74 which each vary in their thickness corresponding to the type of electrical device they conceal or with which they interface. For example, the portion of the adapter plate 68 that conceals the duplex receptacle 60 will need to be thicker than the portion of the adapter plate 70 that conceals the GFCI receptacle 62 so that the exposed surfaces of the adapter plates 68 and 70 are co-planar. FIG. 14 illustrates the co-planar exposed surfaces of the adapter plates 68, 70, 72, and 74 when installed over the electrical devices. The principle of varying the thickness of an adapter plate used to cover a particular electrical device type can permit a wide variety of different electrical devices to be rendered co-planar. Using conventional systems, co-planar implementations for differing device types was not possible. Referring to FIG. 15, sixteen (16) different electrical device adapter plates are shown mounted in a single frame 9, all with exposed surfaces rendered co-planar by the use of an adapter plate of a corresponding thickness. FIG. 15 also illustrates a plurality of different implementations for adapter plates that may be configured for virtually any type of electrical device. Only a limited number of examples is provided here due to the endless possibilities available. Many other implementations will become apparent from the disclosure provided here.

Another particular implementation of an adapter plate 75 is illustrated in FIGS. 16*a* and 16*b*. The adapter plate 75 can be composed of a spacer plate 76 and a shell 78. The spacer plate 76 of this implementation includes a plurality of tabs 80 which couple with a plurality of projections 82 from the shell 78. The tabs 80 and the projections 82 permit the spacer plate 76 and the shell 78 to become an adapter plate 75 which can then be installed into a frame, such as frame 10 shown in FIG. 1*a*. To permit the adapter plate 75 to couple with the apertures 34, 36 in the frame 10 for installation of the adapter plate 75, a first prong 86 and a spring member 88 may be included at the upper side of the spacer plate 76. On the opposing side of the spacer plate 76 a second prong 90 may be included. The first and second prongs 86 and 90 fit into the apertures 34, 36 in the frame 10 when the adapter plate 75 is installed.

Referring to FIG. 17*a*, coupling of the spacer plate 76 and the shell 78 may be accomplished by providing a plurality of slots 84 in the projections 82 attached to the shell 78. In the particular implementation shown in FIG. 17*a*, two sets of slots 84 are provided, which allow the spacing between the shell 78 and the spacer plate 76 to be adjusted, depending on which set of slots 84 the tabs 80 are currently engaged in. FIG. 17*b* illustrates how by using the slots 84 and the tabs 80 to set the distance between the shell 78 and the spacer plate 76, the exposed surface of the adapter plate 75 may be rendered co-planar with the exposed surface of an adjoining electrical device, in this case, a rocker switch. While the particular implementation of an adapter plate 75 has shown two sets of slots 84, other particular implementations may include only one set of slots 84 so that the distance between the shell 78 and the spacer plate 76 is fixed.

Use.

Figure 18:
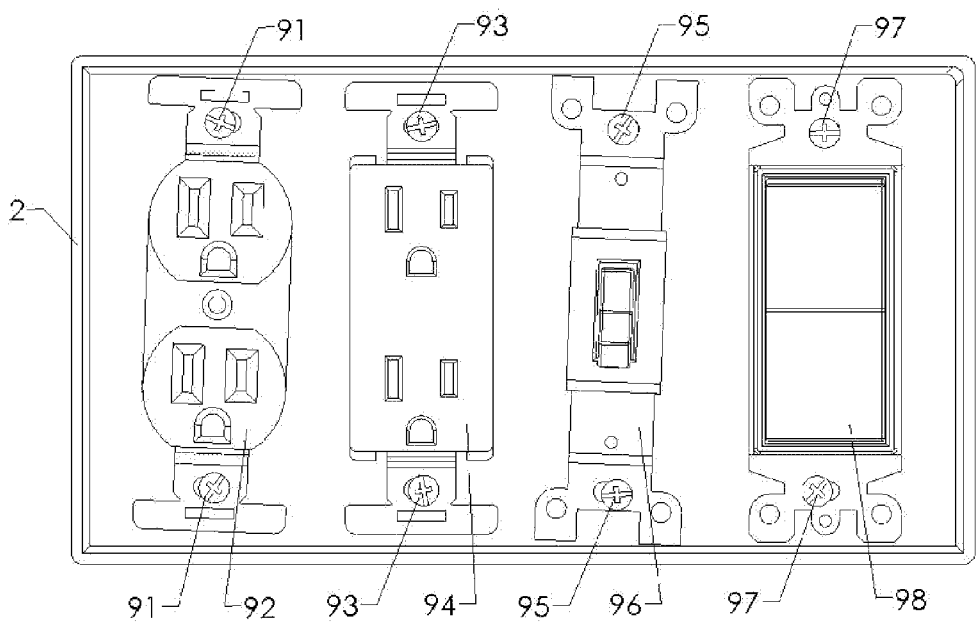
FIG. 18 is a front view of four different electrical devices installed in an electrical box showing that the devices are not aligned with one another.
Figure 19:
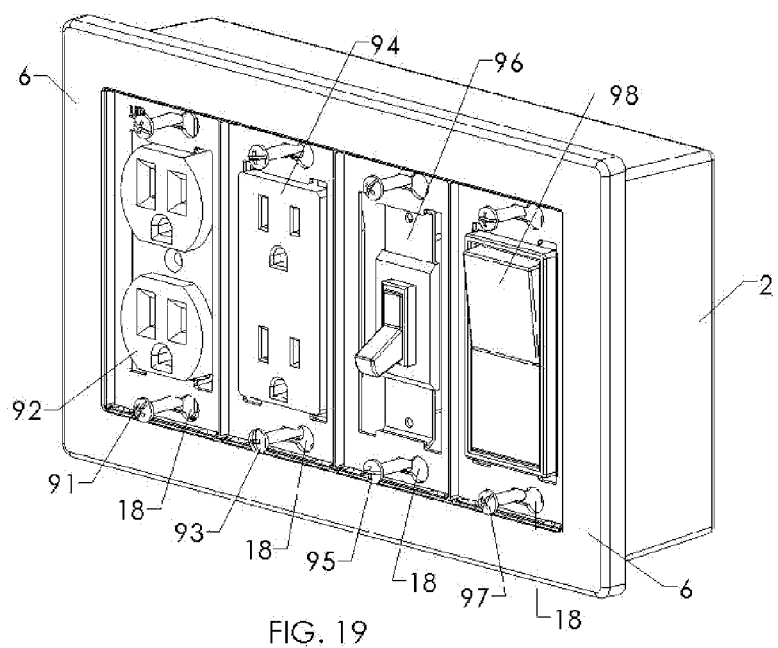
FIG. 19 is a perspective view of a four gang frame inserted over the devices with screws extending through but not tightened in the keyhole box mounting screw apertures of the frame and the devices aligned by the edges of the electrical device apertures.

Referring to FIG. 18, four different electrical devices 92, 94, 96, and 98 have been installed within an electrical box 2. As can be seen from the extreme example of FIG. 18, the four devices 92, 94, 96, and 98 are coupled loosely to the electrical box 2 through a plurality of box mounting screws 91, 93, 95 and 97, and they are not aligned with one another either vertically or horizontally. FIG. 19 shows a frame 6 placed over the four electrical devices 92, 94, 96, and 98 and coupled to the electrical box through the plurality of box mounting screws 91, 93, 95 and 97. The electrical devices 92, 94, 96, and 98 are now aligned vertically and horizontally by the electrical device apertures 16 in the frame 6. Alignment of the devices 92, 94, 96, and 98 occurs automatically as the frame 6 is placed over the devices 92, 94, 96, and 98 and is coupled to the electrical box through the box mounting screws 91, 93, 95 and 97. Although box mounting screws and keyhole box mounting screw apertures are used in this particular implementation, alternative coupling methods and/or alternative box mounting screw aperture configurations may be used. The alignment feature is not dependent upon what method is used to couple the frame to the wall, electrical box or electrical device.

Figure 20:
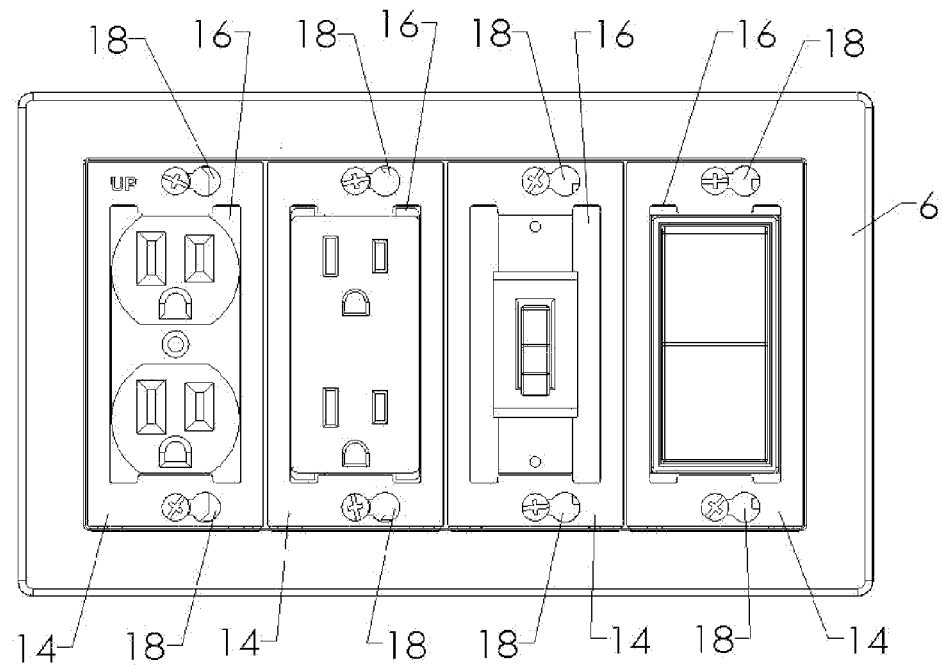
FIG. 20 is a front view of a four gang frame inserted over the devices with screws tightened in the keyhole box mounting screw apertures of the frame and the devices aligned by the edges of the electrical device apertures.
Figure 21:
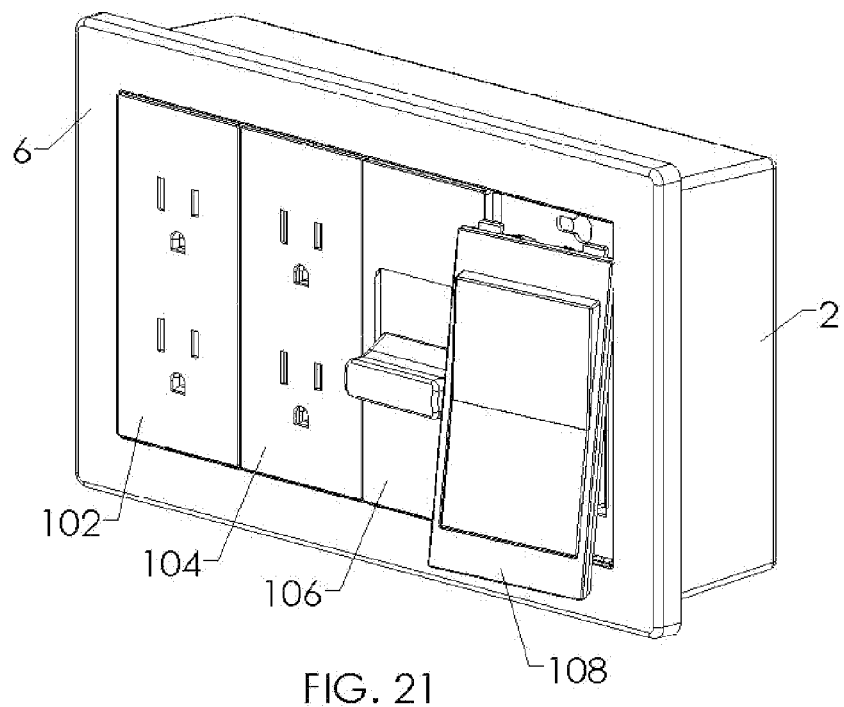
FIG. 21 is a front perspective view of a four gang frame inserted over the devices with three adapter plates installed and the fourth adapter plate in the intermediate step of being snapped into the frame.

FIG. 20 shows the frame 6 with the box mounting screws 91, 93, 95 and 97 tightened down into the box mounting screw apertures 18. FIG. 21 shows the frame 6 with three adapter plates 102, 104, 106 installed into the adapter plate recesses 14 of the frame 6. The last adapter plate 108 is shown partially inserted into the apertures 34 in the adapter plate recess 14 to illustrate how the adapter plate 106 is installed into the frame 6. Installation of the adapter plate 108 is completed by pushing the side of the adapter plate 108 that includes the pawls 32 into the apertures 36 in the adapter plate recess 14. At that point, the adapter plate 106 "snaps in" to the adapter plate recess 14 and conceals the box mounting screw apertures 18, the electrical device aperture 16 and fills the adapter plate recess 14 at least to the edge of the electrical device aperture 16. Removal of the adapter plate 106 may be accomplished by inserting a thin flat object, such as a screw driver, into the narrow gap between the adapter plate 106 and the frame 6 near the pawls 32 (FIGS. 3a-4b) and applying a prying pressure.

It will be understood that implementations are not limited to the specific components disclosed herein, as virtually any components consistent with the intended operation of a method and/or system implementation for an electrical device cover may be utilized. Accordingly, for example, although particular frames, adapter plates, electrical devices, or non-electrically powered devices may be disclosed, such components may comprise any shape, size, style, type, model, version, class, grade, measurement, concentration, material, weight, quantity, and/or the like consistent with the intended operation of a method and/or system implementation for an electrical cover plate may be used.

In places where the description above refers to particular implementations of an electrical cover plate, it should be readily apparent that a number of modifications may be made without departing from the spirit thereof and that these implementations may be applied to other electrical cover plate designs. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electrical cover plate assembly comprising:
    a frame having a finished surface and at least one adapter plate recess in the finished surface, the adapter plate recess comprising an electrical device aperture and at least one adapter coupling aperture through the frame on each of at least two opposing sides of the adapter plate recess; wherein the electrical device aperture is recessed with respect to the finished surface; and
    at least one adapter plate configured to couple directly to the frame, the at least one adapter plate comprising at least one projection extending from a surface of the adapter plate on each of at least two opposing sides of the adapter plate and arranged to align with and extend into the adapter coupling apertures in the adapter plate recess; wherein the adapter plate is sized and shaped to fill the adapter plate recess substantially from its extents at least approximately to an edge of the electrical device aperture;
    wherein the adapter plate recess comprises a mounting structure configured to couple the frame to the electrical box and the mounting structure comprises a box mounting screw aperture positioned to receive a box mounting screw of an electrical device when the electrical cover plate assembly is mounted on an electrical box; and
    wherein the box mounting screw aperture is recessed with respect to the finished surface and the at least one adapter plate is configured to conceal the box mounting screw aperture when coupled to the frame.

2. The electrical cover plate assembly of claim 1, wherein the box mounting screw aperture is a keyhole mounting screw aperture.

3. The electrical cover plate assembly of claim 1, wherein the adapter plate comprises a removable tab; and wherein removal of the removable tab converts the adapter plate to an adapter plate having an opening therethrough configured for an electrical device.

4. The electrical cover plate assembly of claim 1, wherein the assembly further comprises an electrical device having a face and an edge of the face, wherein the electrical device is selected from the group consisting of a decora-style electrical device, a ground fault circuit interrupter outlet and a rocker switch; and wherein the adapter plate is configured to fill the adapter plate recess substantially from its extents approximately up to the edge of the electrical device face.

5. The electrical cover plate assembly of claim 1, wherein the assembly further comprises an electrical device having a face and an edge of the face, wherein the electrical device is selected from the group consisting of a duplex outlet, a ground fault circuit interrupter, a toggle switch, a rocker switch, a rotary dimmer switch and a sliding dimmer switch; and wherein the adapter plate is configured to fill the adapter plate recess substantially from its extents approximately up to the edge of the electrical device face.

6. The electrical cover plate assembly of claim 1, wherein the adapter plate comprises a non-electrically powered device selected from the group consisting of: a keychain holding hook, a coat hanger, a key storage device, a paper towel holder, a mail holder, and a pet leash holder.

7. The electrical cover plate assembly of claim 1, wherein the at least one adapter plate recess in the finished surface comprises at least two similarly configured adapter plate recesses.

8. An electrical cover plate assembly comprising:
a frame having a finished surface and at least one adapter plate recess in the finished surface, the adapter plate recess comprising an electrical device aperture and at least one adapter coupling aperture through the frame on each of at least two opposing sides of the adapter plate recess; wherein the electrical device aperture is recessed with respect to the finished surface; and
at least one adapter plate configured to couple directly to the frame, the at least one adapter plate comprising at least one projection extending from a surface of the adapter plate on each of at least two opposing sides of the adapter plate and arranged to align with and extend into the adapter coupling apertures in the adapter plate recess; wherein the adapter plate is sized and shaped to fill the adapter plate recess substantially from its extents at least approximately to an edge of the electrical device aperture;
wherein the at least one projection extending from a surface of the adapter plate comprises a catch mechanism having a catch and a spring element on at least one side of the adapter plate, the adapter plate being coupled to the frame through the catch mechanism.

9. An electrical device cover plate assembly comprising:
a frame having a finished surface and at least one adapter plate recess in the finished surface, the adapter plate recess comprising an electrical device aperture and at least one adapter coupling aperture through the frame on each of at least two opposing sides of the adapter plate recess; wherein the electrical device aperture is recessed with respect to the finished surface; and
at least one adapter plate configured to couple directly to the frame, the at least one adapter plate comprising at least one projection extending from a surface of the adapter plate on each of at least two opposing sides of the adapter plate and arranged to align with and extend into the adapter coupling apertures in the adapter plate recess; wherein the adapter plate is sized and shaped to fill the adapter plate recess substantially from its extents at least approximately to an edge of the electrical device aperture;
wherein the adapter plate comprises a spacer plate coupled between an adapter shell and the frame.

10. An electrical cover plate assembly comprising:
a frame having a finished surface and at least one adapter plate recess in the finished surface; the adapter plate recess comprising an adapter plate attachment aperture through the frame on each of at least two opposing sides of the adapter plate recess, a box mounting screw aperture, and an electrical device aperture; and
at least one adapter plate configured to couple directly to the frame at the adapter plate recess through a catch mechanism extending from a surface of the at least one adapter plate, the catch mechanism comprising a catch and a spring element on a first side of the adapter plate, the catch mechanism arranged to align with and extend into the adapter coupling apertures;
wherein the adapter plate is configured to conceal the box mounting screw aperture when coupled to the frame and to fill the adapter plate recess substantially from its extents at least approximately to an edge of the electrical device aperture.

11. The electrical cover plate assembly of claim 10, wherein the box mounting screw aperture is a keyhole slot aperture.

12. The electrical cover plate assembly of claim 10, wherein the adapter plate comprises a removable tab; and wherein removal of the removable tab converts the adapter plate to an adapter plate having an opening therethrough configured for an electrical device.

13. The electrical cover plate assembly of claim 10, wherein the assembly further comprises an electrical device having a face and an edge of the face, wherein the electrical device is selected from the group consisting of a decora-style electrical device, a ground fault circuit interrupter outlet and a rocker switch; and wherein the adapter plate is configured to fill the adapter plate recess substantially from its extents approximately up to the edge of the electrical device face.

14. The electrical cover plate assembly of claim 10, wherein the assembly further comprises an electrical device having a face and an edge of the face, wherein the electrical device is selected from the group consisting of a duplex outlet, a ground fault circuit interrupter, a toggle switch, a rocker switch, a rotary dimmer switch and a sliding dimmer switch; and wherein the adapter plate is configured to fill the adapter plate recess substantially from its extents approximately up to the edge of the electrical device face.

15. The electrical cover plate assembly of claim 10, wherein the assembly further comprises an electrical device coupled to the adapter plate and selected from the group consisting of: a nightlight, an emergency light, a fan, an air freshener, a carbon monoxide sensor, a natural gas sensor, an electrical device charging cradle, a hair dryer charging cradle, a cable modem holder, a wireless router holder, a smoke detector, and a rechargeable battery charger.

16. The electrical cover plate assembly of claim 10, wherein the assembly further comprises a battery powered electrical device coupled to the adapter plate and selected from the group consisting of: a smoke detector, a remote ceiling fan controller, a security sensor, an intercom, a fan, a nightlight, an emergency light and a light switch controller.

17. The electrical cover plate assembly of claim 10, wherein the adapter plate comprises a non-electrically powered device selected from the group consisting of: a keychain holding hook, a coat hanger, a key storage device, a paper towel holder, a mail holder, and a pet leash holder.

18. The electrical cover plate assembly of claim 10, wherein the at least one adapter plate recess in the finished surface comprises at least two similarly configured adapter plate recesses.

19. The electrical cover plate assembly of claim 18, wherein the at least two adapter plate recesses comprise a first adapter plate recess and a second adapter plate recess, the first and second adapter plate recesses having an alignment separator between them, the alignment separator forming at least a portion of an edge of the electrical device aperture associated with each adapter plate recess; wherein the electrical device aperture associated with each adapter plate recess is substantially parallel to the adapter plate recess adjacent it and is sized to contact at least a portion of each electrical device to be mounted therein such that mounting of the frame on at least two adjacent electrical devices automatically aligns the electrical devices with each other and the frame.

20. The electrical device cover plate assembly of claim 10, wherein the adapter plate comprises a spacer plate coupled between an adapter shell and the frame.

21. A method of installing an electrical cover plate assembly, the method comprising:
providing an electrical box and at least one electrical device mounted to the electrical box with box mounting screws;
coupling a frame to the electrical box with the electrical box mounting screw, the frame having a finished surface and an adapter plate recess in the finished surface, the adapter plate recess comprising at least one box mounting screw aperture and an electrical device aperture each recessed with respect to the finished surface; and concealing the box mounting screw aperture by coupling an adapter plate directly to the frame to the adapter plate recess through at least one projection extending directly from a surface of the adapter plate on each of at least two opposing sides of the adapter plate, the adapter plate sized and shaped to fill the adapter plate recess substantially from its extents at least approximately to an edge of the electrical device.

22. The method of claim 21, wherein the at least one electrical device comprises at least two electrical devices and the frame comprises at least two electrical device apertures, the method further comprising automatically aligning the electrical devices when the frame is mounted to the electrical box with the mounting screws by contacting at least one edge of each of the electrical devices with an edge of a corresponding electrical device aperture.

* * * * *